UNITED STATES PATENT OFFICE.

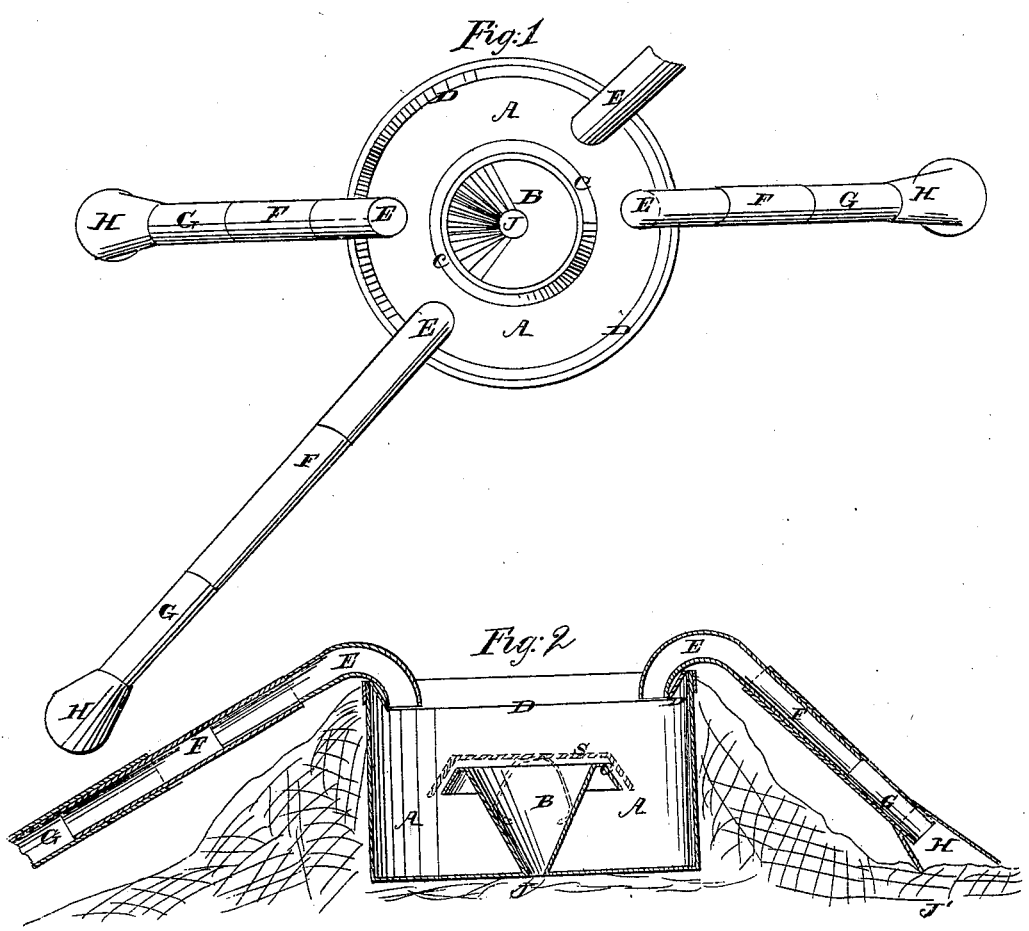

G. W. COTTINGHAM AND JOHN S. MENEFEE, OF TEXANA, TEXAS.

ANT-TRAP.

Specification of Letters Patent No. 29,468, dated August 7, 1860.

*To all whom it may concern:*

Be it known that we, G. W. COTTINGHAM and JOHN S. MENEFEE, of Texana, in the county of Jackson and State of Texas, have invented a new and Improved Trap for Catching Ants; and we do hereby declare that the following is a full, clear, and exact description of the same, reference being had to the accompanying drawings, forming a part of this specification, in which—

Figure 1 is a plan, and Fig. 2, a vertical central section of the device.

Similar letters of reference in each of the several figures indicate corresponding parts.

The nature of our invention consists, 1st, in the arrangement of a receptacle with an inverted conical spout in its bottom, for the purpose hereinafter to be described.

It consists, 2nd, in the combination of a receptacle and inverted conical spout in its bottom with an inwardly bent rim around the top of the receptacle, in the manner and for the purpose hereinafter to be described.

It consists, 3rd, in the combination of a receptacle and conical spout in its bottom, with extension tubes, for the purpose hereinafter to be described.

The object of the implement is to prevent the ravages committed by ants, by gathering the animals from an ant bed into a receptacle which they cannot escape from and can easily be destroyed.

The receptacle A, is open at top and has a central hole in its bottom, from which an inverted conical spout B, extends upward with a bent down rim C, around its top edge, as seen in Fig. 2. The top rim of the box is also bent down toward the interior of the box in the form of a frustum of a cone or a separate rim of the form as described may be placed on top of the receptacle, so that it may be detached if not required.

The receptacle is placed with the center hole in the bottom fitting over an ant hole J, so that the ants, as they come out of the ant hole and run up the inside of the spout B, which is roughened by covering its surface with glue and sand or the like substances, pass over the rim C, of the spout into the receptacle A. The inside of this receptacle is also smooth so as to prevent the animals from crawling up the sides of the receptacle. The perfectly smooth surface of the inside of rim D, however prevents those of the ants which may contrive to run up the sides of the receptacle, from crawling around said rim and out of the receptacle. They slip off the rim and fall down into the receptacle.

Expansion tubes F, G, with one end curved, as seen at E, and the other end trumpet shaped, as seen at H, may be employed to gather the animals from other ant holes into the central receptacle A.

The flaring ends H, of the pipes G, are placed over such ant holes J', and the curved ends E, of the pipes F, are hung over the rim D, of receptacle A, so that the ants running from the holes J', up the pipes G, F, will also finally fall into receptacle A. Pipes which slide into each other, as represented in Fig. 2, or any other extension or flexible pipes, may be employed for the purpose. In this manner an ant bed may, in a very short time, become freed from those destructive animals, when the apparatus may be transferred to another ant-bed, and so forth.

By embanking the earth all around the box, the ants that happen to be out at the time the device is placed on the ground, will afterward crawl up said embankment and tumble over the smooth rim of the receptacle into the latter and be caught in this manner.

Some alkali may be placed in the bottom of the receptacle so as to kill the ants that are gathered in the receptacle. A cover S, as represented in red in Fig. 2, may be placed over the spout so as to darken the opening and prevent the ants from seeing the light before they arrive at the rim and tumble over it into the receptacle.

What we claim as our invention and desire to secure by Letters Patent is—

1. The arrangement of a receptacle with an inverted conical spout in its bottom, substantially as and for the purposes set forth.

2. The combination of a receptacle and inverted conical spout in its bottom with an inwardly bent rim around the top of the receptacle, substantially as and for the purposes set forth.

3. The combination of a receptacle and conical spout in its bottom, with extension tubes substantially as and for the purposes set forth.

G. W. COTTINGHAM.
JOHN S. MENEFEE.

Witnesses:
JAMES W. ALLEN,
BENJAMIN I. WHITE.